US00RE45394E

(19) United States
(12) Reissued Patent
Carlow et al.

(10) Patent Number: US RE45,394 E
(45) Date of Reissued Patent: Mar. 3, 2015

(54) 3D GLASSES

(75) Inventors: Richard A. Carlow, South Pasadena, CA (US); Eugenia J. Chen, Arcadia, CA (US); Michael J. Chen, Tustin, CA (US); Craig Steel, Hollyglen, CA (US); Ashley Tilling, San Juan Capistrano, CA (US); Roozbeh Mousavi, Northridge, CA (US); David T. Hamm, Glendale, CA (US)

(73) Assignee: X6D Limited, Limassol (CY)

(21) Appl. No.: 29/373,728

(22) Filed: May 16, 2011
(Under 37 CFR 1.47)

Related U.S. Patent Documents

Reissue of:
(64) Patent No.: Des. 603,445
Issued: Nov. 3, 2009
Appl. No.: 29/314,202
Filed: Mar. 13, 2009

U.S. Applications:
(63) Continuation-in-part of application No. 29/326,498, filed on Oct. 20, 2008, now Pat. No. Des. 624,952.

(51) LOC (10) Cl. ..... 16-06
(52) U.S. Cl.
USPC ..... D16/325; D16/326; D16/327; D16/306
(58) Field of Classification Search
USPC ..... D16/300, 309, 312, 317, 325, 326, 327, D16/328, 329, 335, 336; D29/109, 110; D24/110.2; 351/41, 44, 46, 51, 52, 62, 351/158, 106, 111, 113, 114, 119; 2/13, 15, 2/426, 427, 447, 448, 449
See application file for complete search history.

(56) References Cited

U.S. PATENT DOCUMENTS 2,646,439 A 7/1953 Gloyer
D193,028 S 6/1962 Petitio
(Continued)

FOREIGN PATENT DOCUMENTS

AU 332282 6/2010
AU 2010201529 A1 12/2010
(Continued)

OTHER PUBLICATIONS

Bill of Materials for Emitter ECB, which is submitted only as evidence of the nature of a product first sold on or about Feb. 2006.
(Continued)

*Primary Examiner* — Phillip S Hyder
(74) *Attorney, Agent, or Firm* — King & Spalding LLP

(57) CLAIM

We claim the ornamental design for 3D glasses, as shown and described.

DESCRIPTION

[This application claims priority to U.S. design patent application Ser. No. 29/326,498, filed on Oct. 20, 2008, the disclosures of which are incorporated herein by references.] *The file of this patent contains at least one drawing executed in color. Copies of this patent with color drawing(s) will be provided by the Office upon request and payment of the necessary fee.*

Figure 1:
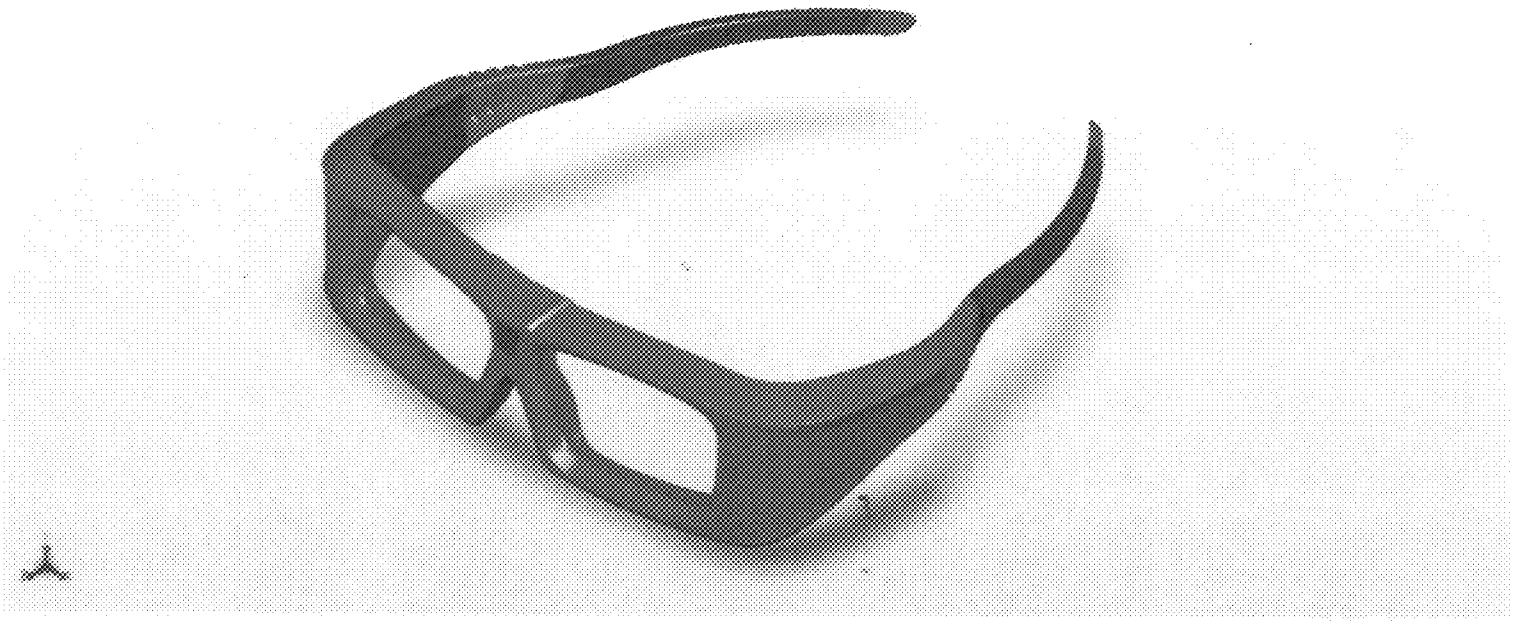
Figure 2:
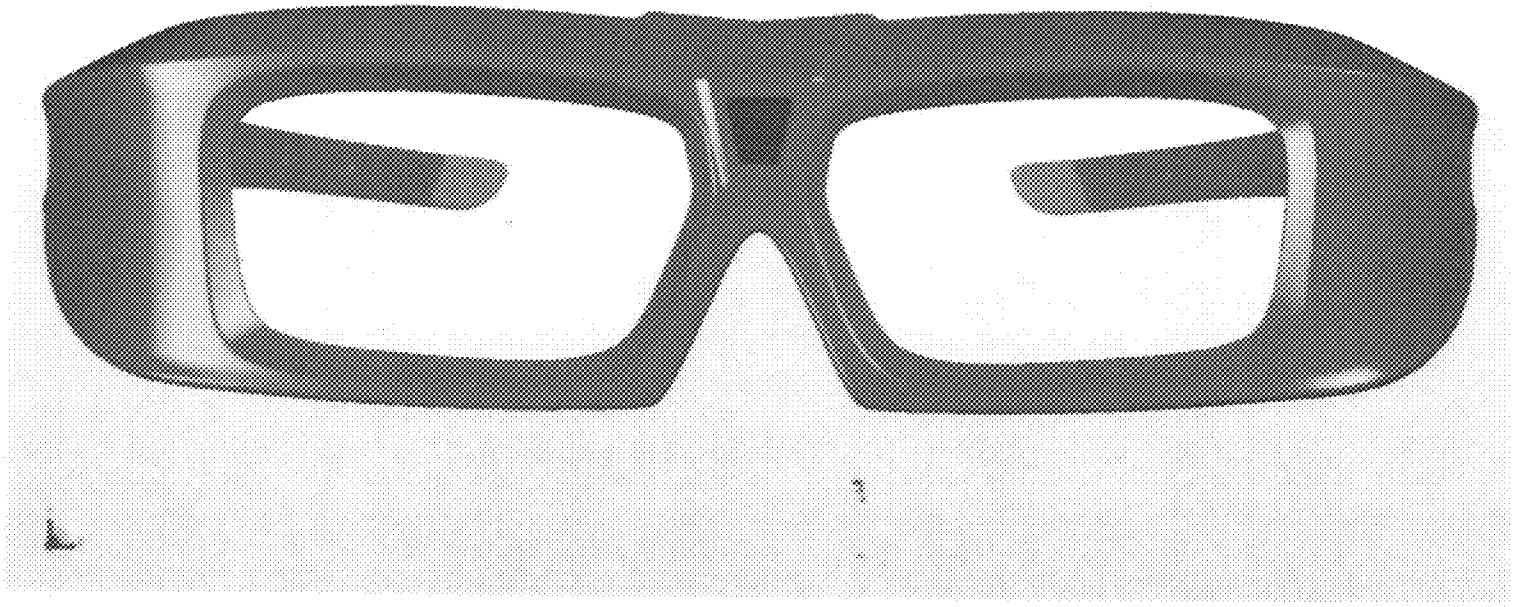
Figure 3:
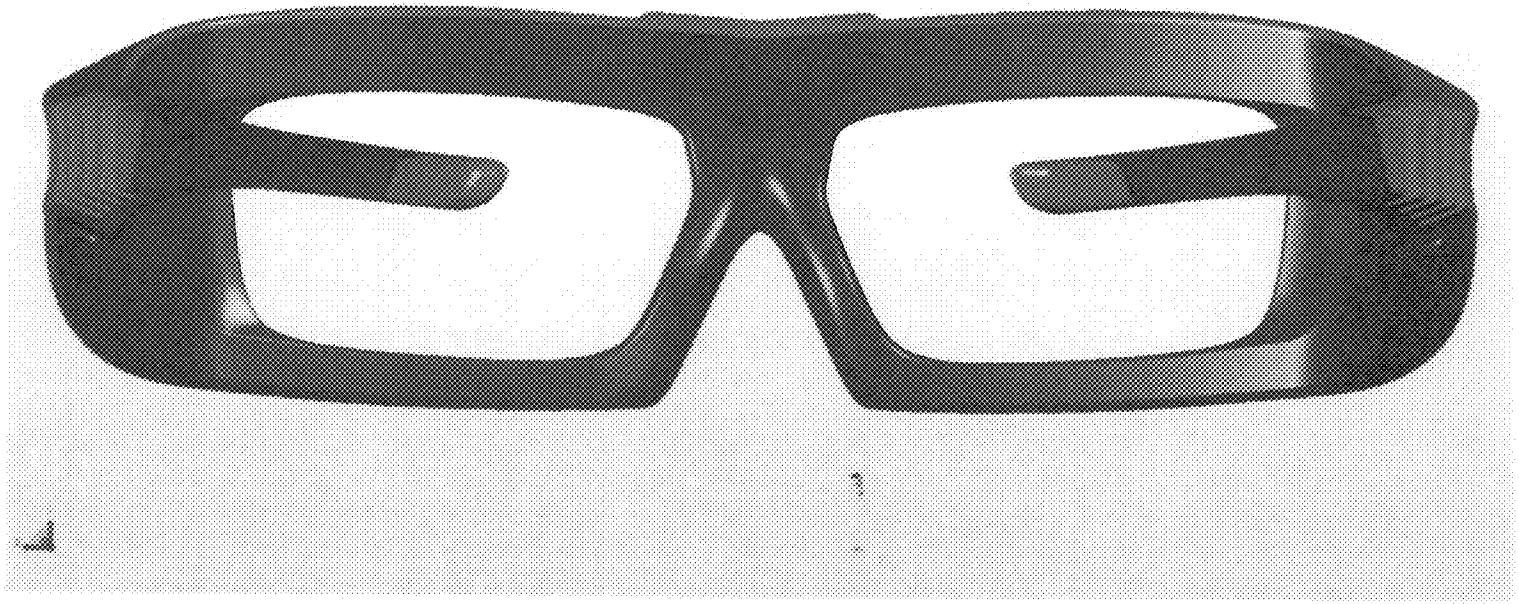
Figure 4:
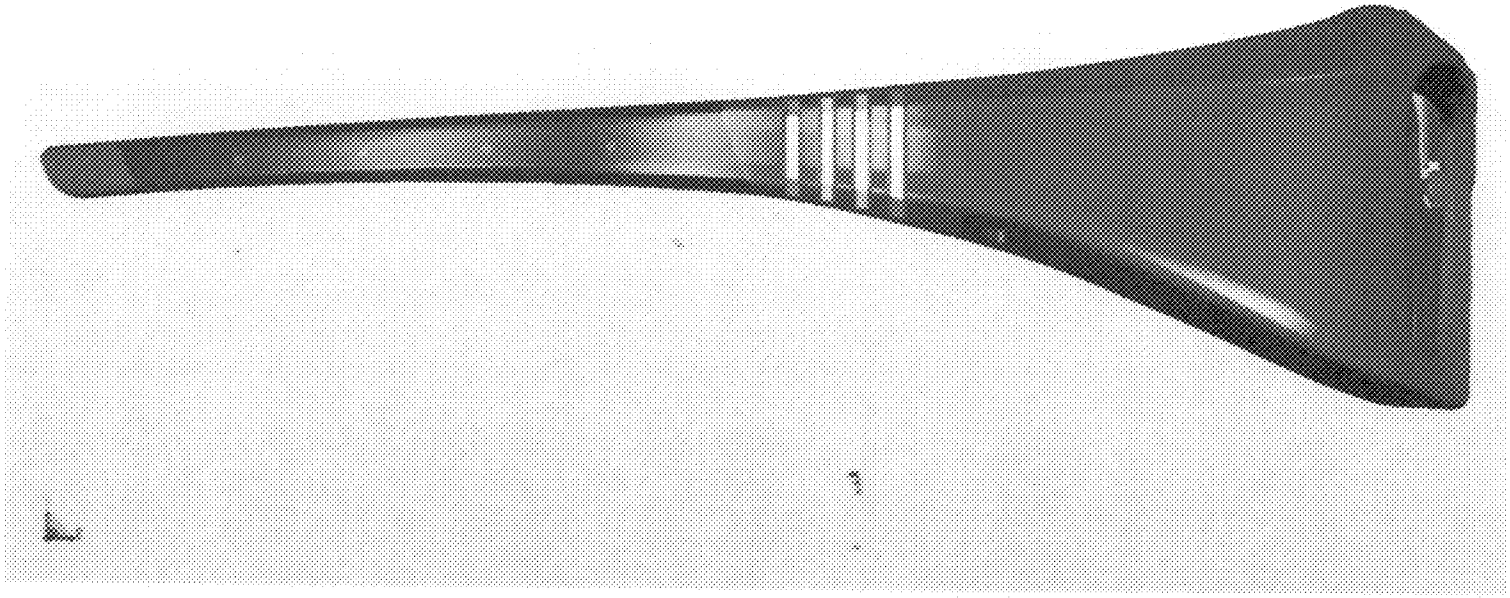
Figure 5:
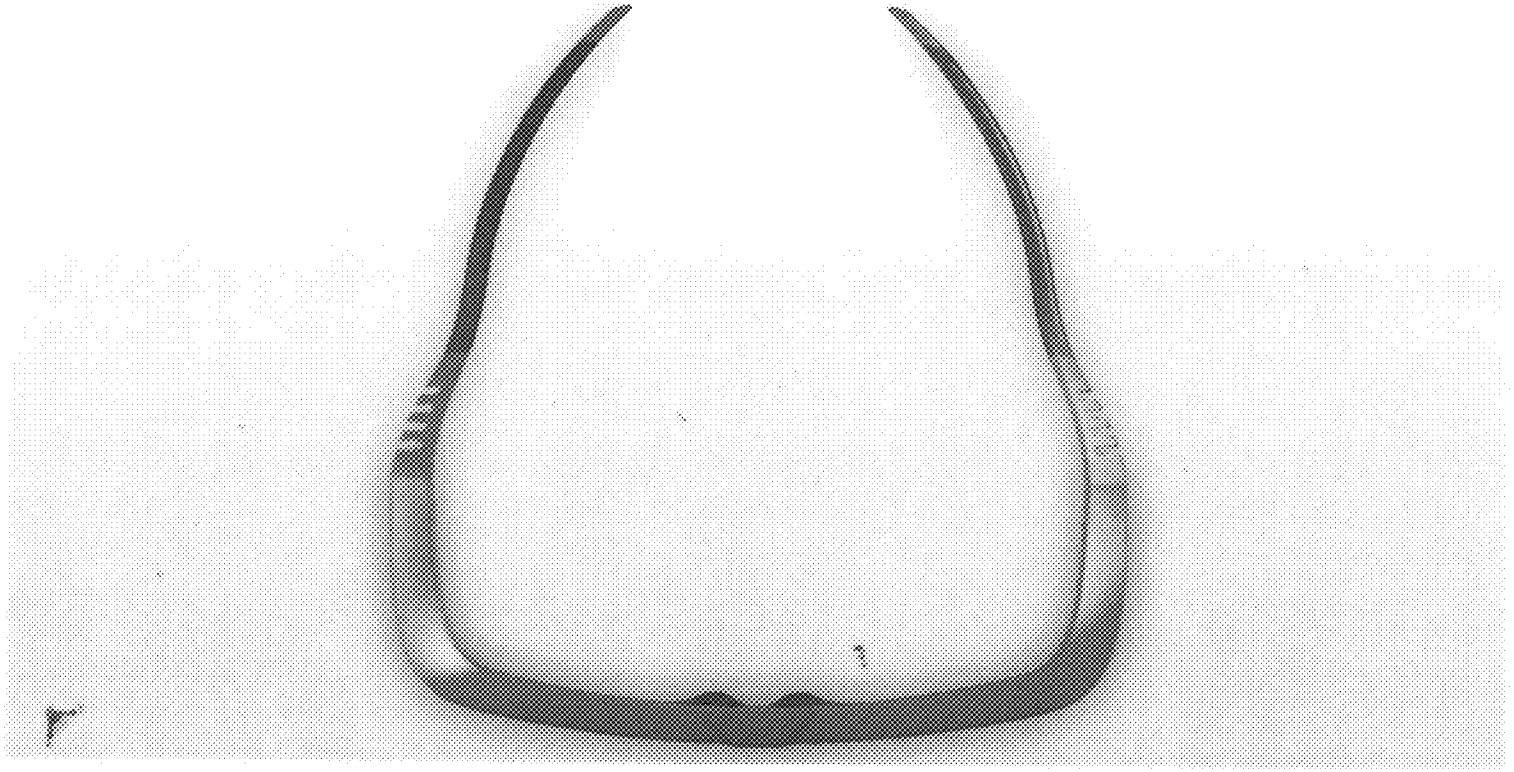
Figure 6:
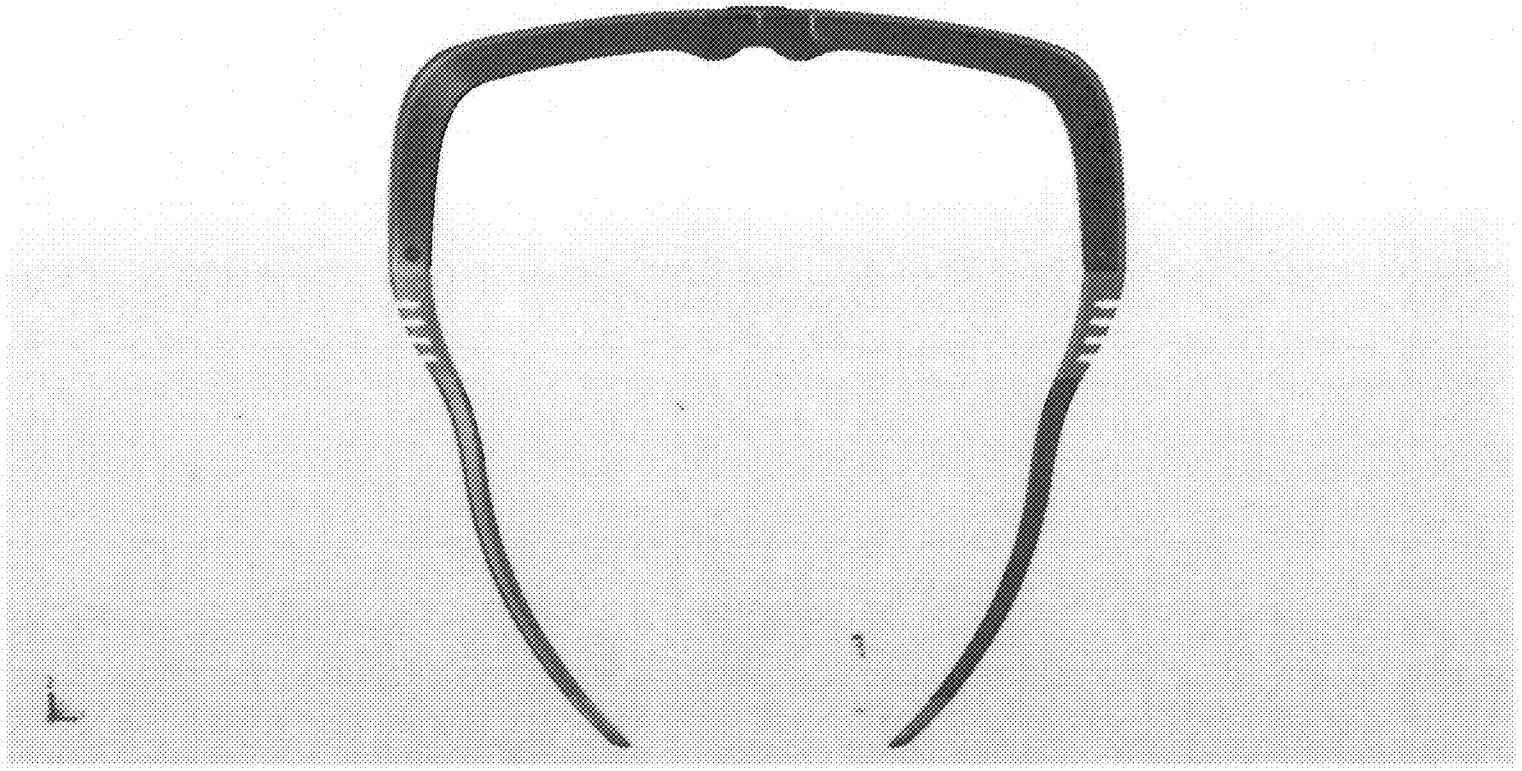

FIG. 1 is [an isometric] *a* perspective view of the front and top of the 3D glasses showing the design of our invention;
FIG. 2 is a front elevation view of the 3D glasses;
FIG. 3 is a rear elevation view [showing exterior of temple of the 3D glasses of FIG. 1] *of the 3D glasses of FIG. 1, wherein the exterior of the temples are shown*;
FIG. 4 is a side [perspective] *elevation* view of the 3D glasses of FIG. 1;
FIG. 5 is a top [front elevation] *plan* view of the 3D glasses of FIG. 1; and,
FIG. 6 is a bottom [elevation] *plan* view of the 3D glasses of FIG. 1.

1 Claim, 6 Drawing Sheets
(6 of 6 Drawing Sheet(s) Filed in Color)

Matter enclosed in heavy brackets [ ] appears in the original patent but forms no part of this reissue; matter printed in italics indicates the additions made by reissue.

AMENDED

(56) References Cited

U.S. PATENT DOCUMENTS 3,621,127 A 11/1971 Hope
3,881,808 A 5/1975 Gurtler et al.
3,903,358 A 9/1975 Roese
3,992,573 A 11/1976 White
4,021,846 A 5/1977 Roese
4,131,342 A 12/1978 Dudley
4,214,267 A 7/1980 Roese et al.
4,286,286 A 8/1981 Jurisson et al.
4,424,529 A 1/1984 Roese et al.
4,562,463 A 12/1985 Lipton
4,571,616 A 2/1986 Haisma et al.
4,583,117 A 4/1986 Lipton et al.
4,635,051 A 1/1987 Bos
4,715,702 A 12/1987 Dillon
4,736,246 A 4/1988 Nishikawa
4,772,944 A 9/1988 Yoshimura
4,786,966 A 11/1988 Hanson et al.
4,851,901 A 7/1989 Iwasaki
4,870,600 A 9/1989 Hiraoka
4,907,860 A 3/1990 Noble
4,943,852 A 7/1990 Femano et al.
4,947,123 A 8/1990 Minezawa
4,963,013 A 10/1990 Bononi
4,966,454 A 10/1990 Toporkiewicz
4,967,268 A 10/1990 Lipton et al.
4,971,435 A 11/1990 Shaw et al.
4,979,033 A 12/1990 Stephens
5,002,387 A 3/1991 Baljet et al.
5,007,715 A 4/1991 Verhulst
5,028,994 A 7/1991 Miyakawa et al.
5,059,017 A 10/1991 Bennato
5,084,763 A 1/1992 Naradate et al.
D323,665 S 2/1992 Simioni
5,117,302 A 5/1992 Lipton
5,119,189 A 6/1992 Iwamoto et al.
5,144,344 A 9/1992 Takahashi et al.
5,153,569 A 10/1992 Kawamura et al.
5,162,919 A 11/1992 Ono
5,175,616 A 12/1992 Milgram et al.
5,187,603 A 2/1993 Bos
5,245,319 A 9/1993 Kilian
5,260,773 A 11/1993 Dischert
5,264,877 A 11/1993 Hussey
5,293,227 A 3/1994 Prince
5,325,192 A 6/1994 Allen
5,327,153 A 7/1994 Biverot
D349,508 S 8/1994 Conway
5,357,277 A 10/1994 Nakayoshi et al.
5,371,556 A 12/1994 Suwa et al.
5,379,369 A 1/1995 Komma et al.
D355,740 S 2/1995 Kirchner
5,402,191 A 3/1995 Dean et al.
D358,150 S 5/1995 Lewis, Jr. et al.
5,414,544 A 5/1995 Aoyagi et al.
5,422,653 A 6/1995 Maguire, Jr.
D360,062 S 7/1995 Mosior
5,452,026 A 9/1995 Marcy, III
5,453,132 A 9/1995 Kowalchuk
5,459,790 A 10/1995 Scofield et al.
5,463,428 A 10/1995 Lipton et al.
5,479,185 A 12/1995 Biverot
5,486,841 A 1/1996 Hara et al.
5,502,481 A 3/1996 Dentinger et al.
5,515,268 A 5/1996 Yoda
5,528,420 A 6/1996 Momochi
5,539,423 A 7/1996 Kim et al.
5,541,641 A 7/1996 Shimada
D372,726 S 8/1996 Simioni
5,553,203 A 9/1996 Faris
5,559,632 A 9/1996 Lawrence et al.
5,572,235 A 11/1996 Mical et al.
5,572,250 A 11/1996 Lipton et al.
5,596,693 A 1/1997 Needle et al.
5,606,363 A 2/1997 Songer
5,619,219 A 4/1997 Coteus et al.
5,629,984 A 5/1997 McManis
5,644,324 A 7/1997 Maguire, Jr.
5,654,746 A 8/1997 McMullan, Jr. et al.
5,661,812 A 8/1997 Scofield et al.
5,671,007 A 9/1997 Songer
5,686,975 A 11/1997 Lipton
5,699,133 A 12/1997 Furuta
5,700,193 A 12/1997 d'Achard Van Enschut
D390,589 S 2/1998 Simioni
D391,596 S 3/1998 Simioni
D392,308 S 3/1998 Simioni
5,734,421 A 3/1998 Maguire, Jr.
5,742,331 A 4/1998 Uomori et al.
5,751,341 A 5/1998 Chaleki et al.
5,752,073 A 5/1998 Gray, III et al.
5,790,184 A 8/1998 Sato et al.
5,796,373 A 8/1998 Ming-Yen
5,805,205 A 9/1998 Songer
5,806,953 A 9/1998 Kucera et al.
5,808,588 A 9/1998 Lin
5,821,989 A 10/1998 Lazzaro et al.
5,822,928 A 10/1998 Maxwell et al.
5,828,427 A 10/1998 Faris
5,838,389 A 11/1998 Mical et al.
5,841,879 A 11/1998 Scofield et al.
5,844,717 A 12/1998 Faris
5,847,710 A 12/1998 Kroitor
5,854,634 A 12/1998 Kroitor
5,867,210 A 2/1999 Rod
5,879,065 A 3/1999 Shirochi et al.
5,886,771 A 3/1999 Osgood
5,886,816 A 3/1999 Faris
5,886,818 A 3/1999 Summer et al.
D407,737 S 4/1999 Hewitt
5,917,539 A 6/1999 Sorensen et al.
5,928,718 A 7/1999 Dillon
5,929,859 A 7/1999 Meijers
5,948,328 A 9/1999 Fiedler et al.
5,959,663 A 9/1999 Oba et al.
5,963,371 A 10/1999 Needham et al.
5,990,936 A 11/1999 Nakayoshi et al.
6,002,518 A 12/1999 Faris
6,005,536 A 12/1999 Beadles et al.
6,011,581 A 1/2000 Swift et al.
D420,035 S 2/2000 Hartman
D422,619 S 4/2000 Hsu
6,078,352 A 6/2000 Nakaya et al.
6,084,654 A 7/2000 Toporkiewicz et al.
6,088,052 A 7/2000 Guralnick
6,094,182 A 7/2000 Maguire, Jr.
6,108,058 A 8/2000 Uchida
6,111,596 A 8/2000 Haskell et al.
6,144,747 A 11/2000 Scofield et al.
6,157,337 A 12/2000 Sato
6,160,574 A 12/2000 Oba et al.
6,181,371 B1 1/2001 Maguire, Jr.
6,188,442 B1 2/2001 Narayanaswami
6,191,772 B1 2/2001 Mical et al.
6,195,205 B1 2/2001 Faris
6,198,485 B1 3/2001 Mack et al.
6,201,566 B1 3/2001 Harada et al.
6,243,207 B1 6/2001 Kawamura et al.
6,252,707 B1 6/2001 Kleinberger et al.
6,259,426 B1 7/2001 Harada et al.
6,259,565 B1 7/2001 Kawamura et al.
6,278,501 B1 8/2001 Lin
6,307,589 B1 10/2001 Maquire, Jr.
D450,744 S 11/2001 Rhoades et al.
6,312,122 B1 11/2001 Brown et al.
6,333,757 B1 12/2001 Faris
6,359,664 B1 3/2002 Faris
6,373,492 B1 4/2002 Kroitor
6,384,971 B1 5/2002 Faris
6,388,797 B1 5/2002 Lipton et al.
6,404,464 B1 6/2002 Faris et al.
6,411,326 B1 6/2002 Tabata
6,414,728 B1 7/2002 Faris et al.
D461,489 S 8/2002 Dituri et al.
6,456,432 B1 9/2002 Lazzaro et al.

(56) References Cited

U.S. PATENT DOCUMENTS

D464,669 S 10/2002 Thixton et al.
6,466,255 B1 10/2002 Kagita et al.
6,476,820 B1 11/2002 Harada et al.
6,496,183 B1 12/2002 Bar-Nahum
6,501,443 B1 12/2002 McMahon
6,507,359 B1 1/2003 Muramoto et al.
6,523,006 B1 2/2003 Ellis et al.
6,526,161 B1 2/2003 Yan
6,529,175 B2 3/2003 Tserkovnyuk et al.
6,529,209 B1 3/2003 Dunn et al.
6,532,008 B1 3/2003 Guralnick
6,535,008 B1 3/2003 Casale
6,556,236 B1 4/2003 Swift et al.
6,564,108 B1 5/2003 Makar et al.
6,570,566 B1 5/2003 Yoshigahara
D475,733 S 6/2003 Lee
6,577,315 B1 6/2003 Kroitor
6,580,556 B2 6/2003 Kakizawa
6,597,328 B1 7/2003 Stern et al.
6,602,194 B2 8/2003 Roundhill et al.
D479,851 S 9/2003 Mangum
6,630,931 B1 10/2003 Trika et al.
6,650,306 B2 11/2003 Yerazunis et al.
6,676,259 B1 1/2004 Trifilo
6,687,399 B1 2/2004 Chuang et al.
6,697,197 B2 2/2004 Sedlmayr
D488,499 S * 4/2004 Mage ..... D16/326
6,721,433 B2 4/2004 Sato
6,724,442 B1 4/2004 Zyskowski et al.
6,738,114 B1 5/2004 Faris
6,759,998 B2 7/2004 Schkolnik
6,765,568 B2 7/2004 Swift et al.
6,791,570 B1 9/2004 Schwerdtner et al.
6,791,599 B1 9/2004 Okada et al.
6,791,752 B2 9/2004 Sedlmayr
6,792,144 B1 9/2004 Yan et al.
6,798,443 B1 9/2004 Maguire, Jr.
6,801,263 B2 10/2004 Sato et al.
6,803,928 B2 10/2004 Bimber et al.
6,842,175 B1 1/2005 Schmalstieg et al.
6,882,476 B2 4/2005 Sedlmayr
6,888,612 B2 5/2005 Faris
6,927,769 B2 8/2005 Roche, Jr.
6,943,852 B2 9/2005 Divelbiss et al.
6,943,949 B2 9/2005 Sedlmayr
6,956,571 B2 10/2005 Sato et al.
6,961,177 B2 11/2005 Sato et al.
6,963,356 B2 11/2005 Satoh
6,970,144 B1 11/2005 Swift et al.
D513,275 S 12/2005 Yee
6,985,168 B2 1/2006 Swift et al.
6,987,549 B2 1/2006 Wu et al.
6,992,462 B1 1/2006 Hussaini et al.
7,002,619 B1 2/2006 Dean et al.
7,019,780 B1 3/2006 Takeuchi et al.
7,030,902 B2 4/2006 Jacobs
7,033,025 B2 4/2006 Winterbotham
7,046,272 B2 5/2006 Schwerdtner
D523,602 S 6/2006 Memari et al.
D523,603 S 6/2006 Memari et al.
7,068,241 B2 6/2006 Sato et al.
7,081,997 B2 7/2006 Sedlmayr
7,085,410 B2 8/2006 Redert
7,102,822 B2 9/2006 Sedlmayr
7,146,095 B2 12/2006 Asami
7,154,468 B2 12/2006 Linzmeier et al.
7,154,671 B2 12/2006 Sedlmayr
D534,569 S 1/2007 Teng
7,164,779 B2 1/2007 Yerazunis et al.
7,167,188 B2 1/2007 Redert
7,180,554 B2 2/2007 Divelbiss et al.
7,190,518 B1 3/2007 Kleinberger et al.
D539,830 S * 4/2007 Saderholm et al. ..... D16/326
D540,370 S 4/2007 Sheldon
D543,573 S 5/2007 Chuang
7,215,356 B2 5/2007 Lin et al.
7,215,357 B1 5/2007 Swift et al.
7,215,809 B2 5/2007 Sato et al.
7,224,411 B2 5/2007 Gibbon et al.
7,233,335 B2 6/2007 Moreton et al.
D545,873 S 7/2007 Sheldon
D547,794 S 7/2007 Jannard et al.
D549,270 S 8/2007 Daems et al.
D552,154 S 10/2007 Arnette
D552,155 S * 10/2007 Markovitz ..... D16/326
7,280,110 B2 10/2007 Sato et al.
7,289,539 B1 10/2007 Mimberg
D554,687 S 11/2007 Arnette
D556,246 S 11/2007 Yee
D556,411 S 11/2007 Weiss
7,295,371 B1 11/2007 Sedlmayr
D557,730 S * 12/2007 Mage ..... D16/326
D558,816 S 1/2008 Yee
7,315,408 B2 1/2008 Schwerdtner
D561,810 S * 2/2008 Fox et al. ..... D16/325
D561,812 S 2/2008 Fox et al.
D565,085 S 3/2008 Mage
7,349,006 B2 3/2008 Sato et al.
D567,842 S * 4/2008 Miklitarian ..... D16/326
7,362,962 B2 4/2008 Urata
7,375,885 B2 5/2008 Ijzerman et al.
7,388,583 B2 6/2008 Redert
7,394,506 B2 7/2008 Cirkel et al.
7,400,431 B2 7/2008 Schwerdtner et al.
7,405,801 B2 7/2008 Jacobs
7,414,782 B2 8/2008 Jung
D576,662 S * 9/2008 Lane et al. ..... D16/326
7,423,796 B2 9/2008 Woodgate et al.
7,425,069 B2 9/2008 Schwerdtner et al.
7,426,068 B2 9/2008 Woodgate et al.
7,436,476 B2 10/2008 Sharp et al.
7,439,940 B1 10/2008 Maguire, Jr.
7,450,188 B2 11/2008 Schwerdtner
D584,019 S 12/2008 Yang et al.
7,463,305 B2 12/2008 Wada
7,471,352 B2 12/2008 Woodgate et al.
D585,618 S 1/2009 Yang et al.
7,477,206 B2 1/2009 Cowan et al.
7,477,331 B2 1/2009 Lin et al.
7,489,311 B2 2/2009 Lee
7,489,445 B2 2/2009 McKee, Jr.
D587,741 S 3/2009 Chen
7,502,003 B2 3/2009 Lipton et al.
7,502,010 B2 3/2009 Kirk
7,505,108 B2 3/2009 Mochizuki
7,508,589 B2 3/2009 Robinson et al.
7,510,280 B2 3/2009 Sharp
7,511,787 B2 3/2009 Sharp
7,517,081 B2 4/2009 Lipton et al.
7,518,662 B2 4/2009 Chen et al.
7,524,053 B2 4/2009 Lipton
7,525,565 B2 4/2009 Van Geest
7,528,830 B2 5/2009 Redert
7,528,906 B2 5/2009 Robinson et al.
7,532,272 B2 5/2009 Woodgate et al.
7,535,607 B2 5/2009 Schwerdtner et al.
D595,333 S 6/2009 Markovitz et al.
7,542,206 B2 6/2009 Schuck et al.
7,545,469 B2 6/2009 Robinson et al.
7,548,273 B2 6/2009 Wada et al.
D596,659 S 7/2009 Kucera et al.
7,570,260 B2 8/2009 Akka et al.
7,573,457 B2 8/2009 Daly
D600,738 S 9/2009 Su et al.
7,583,437 B2 9/2009 Lipton et al.
7,595,852 B2 9/2009 Shibasaki et al.
D603,445 S 11/2009 Carlow et al.
D613,328 S 4/2010 Carlow et al.
D616,486 S 5/2010 Carlow et al.
7,773,178 B2 8/2010 Nakagawa
D624,952 S 10/2010 Carlow et al.
2001/0028413 A1 10/2001 Tropper
2001/0038491 A1 11/2001 Fergason
2001/0043266 A1 11/2001 Robinson et al.

(56) References Cited

U.S. PATENT DOCUMENTS

| | | | |
|---|---|---|---|
| 2001/0050754 | A1 | 12/2001 | Hay et al. |
| 2002/0085151 | A1 | 7/2002 | Faris et al. |
| 2002/0105483 | A1 | 8/2002 | Yamazaki et al. |
| 2002/0105486 | A1 | 8/2002 | Hayashi |
| 2002/0118277 | A1 | 8/2002 | Divelbiss et al. |
| 2002/0122585 | A1 | 9/2002 | Swift et al. |
| 2002/0171617 | A1 | 11/2002 | Fuller |
| 2003/0014212 | A1 | 1/2003 | Ralston et al. |
| 2003/0112507 | A1 | 6/2003 | Divelbiss et al. |
| 2003/0133569 | A1 | 7/2003 | Stern et al. |
| 2003/0199316 | A1 | 10/2003 | Miyamoto et al. |
| 2004/0027267 | A1 | 2/2004 | Rousso |
| 2004/0056948 | A1 | 3/2004 | Gibson |
| 2004/0125447 | A1 | 7/2004 | Sato et al. |
| 2004/0196428 | A1 | 10/2004 | Mochizuki et al. |
| 2005/0046941 | A1 | 3/2005 | Satoh et al. |
| 2005/0170889 | A1 | 8/2005 | Lum et al. |
| 2005/0179785 | A1 | 8/2005 | Endo |
| 2005/0207486 | A1 | 9/2005 | Lee et al. |
| 2005/0213759 | A1 | 9/2005 | Tsuchida |
| 2005/0248722 | A1 | 11/2005 | Nelis |
| 2005/0264904 | A1 | 12/2005 | Sato et al. |
| 2005/0284845 | A1 | 12/2005 | Satoh et al. |
| 2006/0020823 | A1 | 1/2006 | Morino |
| 2006/0044508 | A1 | 3/2006 | Mochizuki |
| 2006/0055994 | A1 | 3/2006 | Schwerdtner |
| 2006/0119539 | A1 | 6/2006 | Kato et al. |
| 2006/0139710 | A1 | 6/2006 | Schwerdtner |
| 2006/0139711 | A1 | 6/2006 | Leister et al. |
| 2006/0203339 | A1 | 9/2006 | Kleinberger et al. |
| 2006/0214875 | A1 | 9/2006 | Sonehara |
| 2006/0238700 | A1 | 10/2006 | Del Vecchio |
| 2006/0238836 | A1 | 10/2006 | Schwerdtner |
| 2006/0238837 | A1 | 10/2006 | Schwerdtner |
| 2006/0238838 | A1 | 10/2006 | Schwerdtner |
| 2006/0238839 | A1 | 10/2006 | Schwerdtner |
| 2006/0238840 | A1 | 10/2006 | Schwerdtner |
| 2006/0238843 | A1 | 10/2006 | Schwerdtner |
| 2006/0238844 | A1 | 10/2006 | Schwerdtner |
| 2006/0250671 | A1 | 11/2006 | Schwerdtner et al. |
| 2006/0256287 | A1 | 11/2006 | Jacobs |
| 2006/0268104 | A1 | 11/2006 | Cowan et al. |
| 2006/0268105 | A1 | 11/2006 | Jacobs et al. |
| 2006/0279567 | A1 | 12/2006 | Schwerdtner et al. |
| 2006/0291049 | A1 | 12/2006 | Juenger et al. |
| 2007/0002267 | A1 | 1/2007 | Mochizuki |
| 2007/0003709 | A1 | 1/2007 | Mochizuki et al. |
| 2007/0033531 | A1 | 2/2007 | Marsh |
| 2007/0035492 | A1 | 2/2007 | Chang |
| 2007/0035493 | A1 | 2/2007 | Chang |
| 2007/0070476 | A1 | 3/2007 | Yamada et al. |
| 2007/0109401 | A1 | 5/2007 | Lipton et al. |
| 2007/0117485 | A1 | 5/2007 | Sakata et al. |
| 2007/0126904 | A1 | 6/2007 | Kimura |
| 2007/0133089 | A1 | 6/2007 | Lipton et al. |
| 2007/0145245 | A1 | 6/2007 | Smith et al. |
| 2007/0177007 | A1 | 8/2007 | Lipton et al. |
| 2007/0183033 | A1 | 8/2007 | Schwerdtner |
| 2007/0188667 | A1 | 8/2007 | Schwerdtner |
| 2007/0206155 | A1 | 9/2007 | Lipton |
| 2007/0229395 | A1 | 10/2007 | Slavenburg et al. |
| 2007/0236560 | A1 | 10/2007 | Lipton et al. |
| 2007/0247590 | A1 | 10/2007 | Schwerdtner |
| 2007/0257902 | A1 | 11/2007 | Satoh et al. |
| 2007/0263003 | A1 | 11/2007 | Ko et al. |
| 2007/0268590 | A1 | 11/2007 | Schwerdtner |
| 2007/0279541 | A1 | 12/2007 | Mochizuki et al. |
| 2007/0285509 | A1 | 12/2007 | Lee |
| 2008/0036696 | A1 | 2/2008 | Slavenburg et al. |
| 2008/0043209 | A1 | 2/2008 | Widdowson et al. |
| 2008/0049100 | A1 | 2/2008 | Lipton et al. |
| 2008/0062259 | A1 | 3/2008 | Lipton et al. |
| 2008/0062297 | A1 | 3/2008 | Sako et al. |
| 2008/0079880 | A1 | 4/2008 | Mochizuki et al. |
| 2008/0094528 | A1 | 4/2008 | Robinson et al. |
| 2008/0117491 | A1 | 5/2008 | Robinson |
| 2008/0122996 | A1 | 5/2008 | Mochizuki |
| 2008/0129899 | A1 | 6/2008 | Sharp |
| 2008/0136901 | A1 | 6/2008 | Schwerdtner |
| 2008/0143964 | A1 | 6/2008 | Cowan et al. |
| 2008/0143965 | A1 | 6/2008 | Cowan et al. |
| 2008/0149517 | A1 | 6/2008 | Lipton et al. |
| 2008/0151112 | A1 | 6/2008 | Basile et al. |
| 2008/0151370 | A1 | 6/2008 | Cook et al. |
| 2008/0186573 | A1 | 8/2008 | Lipton |
| 2008/0186574 | A1 | 8/2008 | Robinson et al. |
| 2008/0192152 | A1 | 8/2008 | Facius et al. |
| 2008/0198430 | A1 | 8/2008 | Schwerdtner et al. |
| 2008/0198431 | A1 | 8/2008 | Schwerdtner |
| 2008/0212153 | A1 | 9/2008 | Haussler et al. |
| 2008/0226281 | A1 | 9/2008 | Lipton |
| 2008/0231767 | A1 | 9/2008 | Lee |
| 2008/0231805 | A1 | 9/2008 | Schwerdtner |
| 2008/0239067 | A1 | 10/2008 | Lipton |
| 2008/0239068 | A1 | 10/2008 | Lipton |
| 2008/0246753 | A1 | 10/2008 | Amroun et al. |
| 2008/0247042 | A1 | 10/2008 | Scwerdtner |
| 2008/0252950 | A1 | 10/2008 | Schwerdtner |
| 2008/0278805 | A1 | 11/2008 | Schwerdtner |
| 2008/0303895 | A1 | 12/2008 | Akka et al. |
| 2008/0303896 | A1 | 12/2008 | Lipton et al. |
| 2008/0315442 | A1 | 12/2008 | Schwerdtner |
| 2008/0316375 | A1 | 12/2008 | Lipton et al. |
| 2009/0015918 | A1 | 1/2009 | Morozumi et al. |
| 2009/0027772 | A1 | 1/2009 | Robinson |
| 2009/0040402 | A1 | 2/2009 | Tomita et al. |
| 2009/0046348 | A1 | 2/2009 | Sahm et al. |
| 2009/0051759 | A1 | 2/2009 | Adkins et al. |
| 2009/0066863 | A1 | 3/2009 | Chen |
| 2009/0079747 | A1 | 3/2009 | Johnson et al. |
| 2009/0085928 | A1 | 4/2009 | Riach et al. |
| 2009/0086296 | A1 | 4/2009 | Renaud-Goud |
| 2009/0097117 | A1 | 4/2009 | Coleman |
| 2009/0109281 | A1 | 4/2009 | Mashitani et al. |
| 2009/0109282 | A1 | 4/2009 | Schnebly et al. |
| 2009/0109395 | A1 | 4/2009 | Fuziak, Jr. |
| 2009/0128780 | A1 | 5/2009 | Schuck et al. |
| 2009/0158220 | A1 | 6/2009 | Zalewski et al. |
| 2009/0160757 | A1 | 6/2009 | Robinson |
| 2009/0190210 | A1 | 7/2009 | Coleman et al. |
| 2009/0215475 | A1 | 8/2009 | Sangberg |
| 2009/0219595 | A1 | 9/2009 | Olaya et al. |
| 2009/0225380 | A1 | 9/2009 | Schwerdtner et al. |
| 2009/0225381 | A1 | 9/2009 | Olaya et al. |
| 2009/0251531 | A1 | 10/2009 | Marshall et al. |
| 2009/0290450 | A1 | 11/2009 | Rioux et al. |
| 2010/0066976 | A1 | 3/2010 | Richards et al. |
| 2010/0086285 | A1 | 4/2010 | Sasaki et al. |
| 2010/0117592 | A1 | 5/2010 | Lim et al. |
| 2010/0149320 | A1 | 6/2010 | MacNaughton et al. |
| 2010/0149636 | A1 | 6/2010 | MacNaughton et al. |
| 2010/0157028 | A1 | 6/2010 | MacNaughton et al. |
| 2010/0157029 | A1 | 6/2010 | MacNaughton et al. |
| 2010/0157031 | A1 | 6/2010 | MacNaughton et al. |
| 2010/0157178 | A1 | 6/2010 | MacNaughton et al. |
| 2010/0177172 | A1 | 7/2010 | Ko et al. |
| 2010/0177174 | A1 | 7/2010 | Ko et al. |
| 2010/0177254 | A1 | 7/2010 | MacNaughton et al. |
| 2010/0182407 | A1 | 7/2010 | Ko et al. |
| 2010/0191087 | A1 | 7/2010 | Talbot et al. |
| 2010/0194857 | A1 | 8/2010 | Mentz et al. |
| 2010/0201788 | A1 | 8/2010 | Ho et al. |
| 2010/0225751 | A1 | 9/2010 | Nemeth |
| 2010/0245693 | A1 | 9/2010 | MacNaughton et al. |
| 2010/0277485 | A1 | 11/2010 | Zalewski |

(56) References Cited

U.S. PATENT DOCUMENTS

| | | | |
|---|---|---|---|
| 2010/0309535 | A1 | 12/2010 | Landowski et al. |
| 2011/0001808 | A1 | 1/2011 | Mentz et al. |
| 2011/0012896 | A1 | 1/2011 | Ji |
| 2011/0122238 | A1 | 5/2011 | Hulvey et al. |
| 2011/0134231 | A1 | 6/2011 | Hulvey et al. |

FOREIGN PATENT DOCUMENTS

| | | | |
|---|---|---|---|
| CA | 2 646 439 | A1 | 11/2007 |
| CA | 2684513 | | 5/2010 |
| CN | 200930311475.2 | | 8/2009 |
| CN | 200930320008.6 | | 10/2009 |
| CN | 201030112066.2 | | 2/2010 |
| CN | 201030112074.7 | | 2/2010 |
| CN | 201030112081.7 | | 2/2010 |
| CN | 201030156835.9 | | 5/2010 |
| CN | 301263913 | | 6/2010 |
| CN | 201030261366.7 | | 8/2010 |
| CN | 101825772 | | 9/2010 |
| DE | 102006011773 | | 9/2007 |
| EM | 001610635-0001 | | 4/2009 |
| EM | 1123913 | | 7/2009 |
| EM | 1573312 | | 7/2009 |
| EM | 001573312 | | 9/2009 |
| EM | 00635335.0001 | | 2/2010 |
| EM | 001635418-0001 | | 2/2010 |
| EM | 001635418-0002 | | 2/2010 |
| EM | 001624552-0001 | | 3/2010 |
| EM | 001624552-0002 | | 3/2010 |
| EM | 001728015-0001 | | 8/2010 |
| EM | 001728015-0002 | | 8/2010 |
| EP | 0 730 371 | A2 | 9/1996 |
| EP | 1761075 | A2 | 3/2007 |
| EP | 2056155 | A2 | 5/2009 |
| EP | 2081182 | A1 | 7/2009 |
| EP | 2315449 | A2 | 4/2011 |
| EP | 2323686 | A1 | 5/2011 |
| FR | 2684770 | A1 | 5/1991 |
| FR | 2 814 965 | A1 | 4/2002 |
| FR | 2938664 | | 5/2010 |
| JP | 9005674 | | 1/1997 |
| JP | 09329771 | | 12/1997 |
| JP | 11098538 | A | 4/1999 |
| JP | 1374986 | | 10/2009 |
| JP | 1375009 | | 10/2009 |
| JP | 1388190 | | 5/2010 |
| JP | 1388191 | | 5/2010 |
| JP | 1388720 | | 5/2010 |
| JP | 2010124466 | | 6/2010 |
| JP | 1391842 | | 7/2010 |
| JP | 1390943 | | 8/2010 |
| RU | 2093970 | C1 | 10/1997 |
| RU | 2337386 | C2 | 10/2008 |
| RU | 74845 | | 5/2010 |
| RU | 75314 | | 6/2010 |
| RU | 2413266 | C1 | 2/2011 |
| WO | 9743681 | | 11/1997 |
| WO | 9743681 | A1 | 11/1997 |
| WO | 9852091 | | 11/1998 |
| WO | 00/01456 | A1 | 1/2000 |
| WO | 02/063378 | A1 | 8/2002 |
| WO | 03/003750 | A1 | 1/2003 |
| WO | 2007067493 | A2 | 6/2007 |
| WO | 2007104533 | | 9/2007 |
| WO | 2007/117485 | A2 | 10/2007 |
| WO | 2007126904 | | 11/2007 |
| WO | 2007126904 | A1 | 11/2007 |
| WO | 2008/079796 | A2 | 7/2008 |
| WO | 2008079796 | | 7/2008 |
| WO | 2010/144478 | A2 | 12/2010 |

OTHER PUBLICATIONS

Bill of Materials for Microcontrol Unit ECB, which is submitted only as evidence of the nature of a product first sold on or about Jan. 2005.

Bill of Materials for IR Amplifier ECB, which is submitted only as evidence of the nature of a product first sold on or about Jan. 2005.

Schematic: 60GX-T1 Emitter Module IR Emitter, which is submitted only as evidence of the nature of a product first sold on or about Mar. 1998.

Schematic: 60GX-C1 IR Glasses Amplifier Board, which is submitted only as evidence of the nature of a product first sold on or about Jul. 1998.

Schematic: 60GX-C1 IR Glasses CPU Board, which is submitted only as evidence of the nature of a product first sold on or about Apr. 2000.

Schematic: 61_62_60GX-T50, which is submitted only as evidence of the nature of a product first sold on or about Feb. 2008.

Correspondence from S. Dang to M. Fowler re Plaintiffs' Identification of Trade Secrets, which is submitted as evidence of allegations of opposing counsel on or around May 11, 2011.

Schematic: AP388pcb Prototype, which is submitted only as evidence of the nature of a product prototype on or about Aug. 31, 2005.

Schematic: Li-Tek 07874—3D Cinema Systems, which was registered with the copyright office on Apr. 20, 2011.

Schematic: Li-Tek 07875—3D DT Main, which was registered with the copyright office on Apr. 20, 2011.

Schematic: XpanD 3D Cinema Sync Distribution Module, which is submitted only as evidence of the nature of a product prototype created on or about Feb. 6, 2009.

Li-Tek Schematic: for "3D cinema systems", copyright registration dated Jul. 8, 2011 (VA1-784-087).

Li-Tek Schematic: for "3D cinema systems", copyright registration dated Jul. 8, 2011 (VA1-784-089).

Li-Tek Schematic: for "3D cinema systems", copyright registration dated Jul. 8, 2011 (VA1-784-082).

Li-Tek Schematic: for "3D cinema systems", copyright registration dated Jul. 8, 2011 (VA1-784-088).

Li-Tek Schematic: for "3D TV Glass", copyright registration dated Jul. 8, 2011 (VA1-784-081).

Li-Tek Schematic: for "3D TV Glass", copyright registration dated Jul. 8, 2011 (VA1-784-086).

Li-Tek Schematic: for "3D TV System", copyright registration dated Jul. 8, 2011 (VA1-784-083).

Li-Tek Schematic: for "3D TV System", copyright registration dated Jul. 8, 2011 (VA1-784-091).

Li-Tek Schematic: for "3D TV System", copyright registration dated Jul. 8, 2011 (VA1-784-103).

Li-Tek Schematic: for "3D cinema systems", copyright registration dated Apr. 20, 2011 (VA1-784-195).

Li-Tek Schematic: for "3D DT_Main", copyright registration dated Apr. 20, 2011 (VA1-784-186).

Register of Actions, *Allen Dyer Doppelt Milbrath & Gilchrist PA, et al* vs. *Super Vision International Inc,* Case No. 2006-CA-009026-O, dated Oct. 24, 2012 (2 Pages).

Register of Actions, *Super Vision International Inc, et al* vs. *Allen Dyer Doppelt Milbrath & Gilchrist PA,* Case No. 2002-CA-000393-O, dated Oct. 24, 2012 (19 Pages).

Register of Actions, *Caruso, Jack* vs. *Whittle, Jeffrey S et al,* Case No. 2006-CA-004981, dated Oct. 24, 2012 (5 Pages).

Case No. 2006-CA-004981, *Caruso, Jack* vs. *Whittle, Jeffrey S et al,* Complaint, dated Jun. 21, 2006 (11 Pages).

Case No. 2002-CA-000393-O, *Super Vision International Inc, et al* vs. *Allen Dyer Doppelt Milbrath & Gilchrist PA,* Complaint, dated Jan. 4, 2002 (15 Pages).

Case No. 2006-CA-009026-O, *Allen Dyer Doppelt Milbrath & Gilchrist PA, et al* vs. *Super Vision International Inc,* Complaint, dated Jun. 6, 2005 (58 Pages).

Correspondence dated Mar. 16, 2011 from S. Dang to M. Fowler re Plaintiffs' Identification of Trade Secrets.

Plaintiffs' First Set of Interrogatories to Defendants Li-Tek Corporation Company; and Dongguan Li Wang Electronics and Plastics Co., Ltd.

Plaintiffs' First Set of Requests for Production of Documents (Nos. 1-91) to Defendants Li-Tek Corporation Company; and Dongguan Li Wang Electronics and Plastics Co., Ltd.

(56) References Cited

OTHER PUBLICATIONS

Objections and Responses to Plaintiffs' First Set of Interrogatories to Defendants Li-Tek Corporation Company; and Dongguan Li Wang Electronics and Plastics Co., Ltd.
Objections and Responses to Plaintiffs' First Set of Requests for Production of Documents to Defendants Li-Tek Corporation Company; and Dongguan Li Wang Electronics and Plastics Co., Ltd.
Responses and Objections of the GDC Defendants and Counterclaimants to X6D's First Set of Interrogatories.
GDC Defendants and Counterclaimants' Responses and Objections to X6D's First Set of Requests for Production of Documents.
Defendants Li-Tek Corporation and Dongguan Li Wang Electronics and Plastics Co. Ltd's Initial Disclosures Pursuant to Federal rule of Procedure 26(a)(1).
Defendant Li-Tek Corporation Company's First Set of Interrogatories to Plaintiffs X6D Limited, X6D USA Inc., and XPand, Inc.
Defendant Li-Tek Corporation Company's First Set of Requests for Production of Documents and Things to Plaintiffs X6D Limited, X6D USA Inc., and XPand, Inc.
GDC Technology Limited's First Set of Interrogatories to X6D.
GDC Technology USA LLC's First Set of Interrogatories to X6D.
GDC Technology (USA) LLC's First Set of Requests for Prodcution of Documents and Things to X6D.
Initial Disclosures of the GDC Defendants and Counerclaimants Pursuant to Rule 26 of the Federal Rules of Civil Procedure.
Plaintiffs' First Set of Interrogatories to the GDC Defendants.
Plaintiffs' First Set of Requests for Production of Documents (Nos. 1-80) to the GDC Defendants.
Plaintiffs' Initial Disclosures Pursuant to Fed. R. Civ. P. 26(a)(1).
Statements made during deposition of Boyd MacNaughton on Aug. 23, 2011.
Statements made during deposition of David Allen on Aug. 26, 2011.
Statements made during deposition of Rodney Kimmell on Sep. 1, 2011.
Defendants' Notice of Motion for Summary Judgment or, in the Alternative, Partial Summary Judgment; Civil Action No. CV-10-02327; *X6D Limited et al.* v. *Li-Tek Corporation Company, et al;* United States District Court, Central District of California, Western Division.
French Search Report from related FR Appl. No. 1056816, dated Oct. 21, 2011.
French Search Report from related FR Appl. No. 1056811, dated Oct. 18, 2011.
French Search Report from related FR Appl. No. 0958073, dated Oct. 14, 2011.
Nienhuys et al., "DC-to-DC converter", Wikipedia (Nov. 13, 2008), http:/en.wikipedia.org/w/index.php?title=DC-to-DC_converter%oldid=251525008, retrieved on Jul. 4, 2011.
Chan, "Everything you need to know about Nvidia's 3D Goggle Gamble", http:/3dcinecast.blogspotcom/2008/09/everything-you-need-to-know-about.html, retreived Jul. 1, 2011.
French Search Report from related FR Appl. No. 1056813, dated Oct. 18, 2011.
French Search Report from related FR Appl. No. 1056814, dated Oct. 21, 2011.
Search Report from related EP Appl. No. 10184340.7, dated Jul. 5, 2011.
Deposition of Boyd MacNaughton dated Aug. 23, 2011 (294 pages).
Deposition of David W. Allen dated Aug. 26, 2011 (290 pages).
Deposition of Rodney Kimmell dated Sep. 1, 2011 (323 pages).
Deposition of Rodney Kimmell dated Sep. 29, 2011 (234 pages).
Corrections to Deposition of David W. Allen dated Oct. 4, 2011 (3 pages).
International Search Report and Written Opinion dated May 26, 2012 issued in International Application No. PCT/US2011/059080 filed Nov. 3, 2011 (13 pages).
International Search Report and Written Opinion dated Aug. 29, 2012, issued in International Application No. PCT/US12/44298 filed Jun. 27, 2012 (6 pages).
Extended European Search Report dated Sep. 12, 2012, issued in EP Application No. 11172351.6 filed Jul. 1, 2011 (8 pages).
Extended European Search Report dated Nov. 22, 2012, issued in EP Application No. 10188205.8 filed Oct. 20, 2010 (10 pages).
Supplementary European Search Report dated Oct. 19, 2012 issued in EP Application No. 04799317 filed Nov. 3, 2004 (4 pages).
International Search Report and Written Opinion dated Dec. 4, 2012 issued in International Application No. PCT/US12/57260 filed Sep. 26, 2012 (9 pages).
European Search Report, dated Nov. 14, 2012, issued in EP Application No. 10188205.8 filed Oct. 20, 2010, (3 pages).
European Search Report, dated Nov. 16, 2012, issued in EP Application No. 10191150.1 filed Nov. 15, 2010, (3 pages).
International Search Report, dated Oct. 21, 2011, issued in International Application No. PCT/US2011/049335 filed Aug. 26, 2011, (3 pages).
Turkish Search Report, dated Nov. 16, 2012, issued in Application No. 2010/09440 filed Nov. 12, 2010.
Turkish Search Report, dated Sep. 14, 2012, issued in Application No. 2011/04994 filed May 23, 2011 (3 pages).
Turkish Search Report, dated Dec. 14, 2012, issued in Application No. 2011/04240 filed Apr. 29, 2011 (52 pages).
Turkish Search Report, dated Dec. 14, 2012, issued in Application No. 2011/04239 filed Apr. 29, 2011 (89 pages).
Case No. 2:10-cv-02327-GHK-PJW;Third Supplemental Responses and Objections to Plaintiff's First Set of Interrogatories to Defendants Li-Tek Corporation Company and Dongguan Li Wang Electronics and Plastics Co. Ltd., Aug. 2, 2011.
Bos, P. and Haven, T., Field-Sequential Stereoscopic Viewing Systems Using Passive Glasses, Tektronix, Inc., Beaverton, OR, 1989, pp. 39-43, vol. 30/1.
USPTO Office Communication dated Dec. 19, 2006 re U.S. Appl. No. 10/252,215, filed Sep. 23, 2002.
Summary of Chinese References Cited (CN200930311475, CN200930320008, CN201030112066, CN201030112074, CN201030112081, CN201030156835 and CN201030261366).
3D-Tech, All Advanced Optics: Prices as of Mar. 28, 2011 (International Sales Office, 3D-Tech Headquarters, Big Sky Industries, Roney International, Inc., GoldenDuck Group, DCS Benelux and Moscow Cinema Production Workshop).
3D-Tech, All Advanced Optics: The Latest technology in Building Active 3D-Glasses; at least as early as Apr. 11, 2011.
AG 100 Schematic; Jan. 27, 2006.
Global Services Product Alert; Jun. 16, 2011.
Case No. CV102327 GHK PJWx—GDC Defendants and Counterclaimants' Supplemental Responses and Objections to X6D's First Set of Interrogatories; Apr. 19, 2011.
Case No. CV102327 GHK PJWx—Answer, Affirmative Defenses, and Counterclaims of Defendants and Counterclaimants Li-Tek Corp and Dongguan Li Wang Electronics and Plastics Co. Ltd. to Plaintiff's Second Amended Complaint; Apr. 25, 2011.
Case No. CV102327 GHK PJWx—GDC Defendants and Counterclaimants Answer and Counterclaims to Second Amended Complaint; Apr. 25, 2011.
Case No. CV102327 GHK PJWx—Plaintiff's Objections and Responses to GDC Technology (USA) LLC's First Requests for Production of Documents and Things; Mar. 30, 2011.
Case No. CV102327 GHK PJWx—Plaintiff's Amended Objections and Answers to Li-Tek Corp. Company's First Set of Interrogatories; Apr. 12, 2011.
Case No. CV102327 GHK PJWx—Plaintiff's Supplemental Objections and Answers to GDC Technology Ltd.'s Interrogatory No. 5; Jun. 3, 2011.
Case No. CV102327 GHK PJWx—Plaintiff's Supplemental Objections and Answers to GDC Technology Ltd.'s Interrogatory No. 4; Jun. 3, 2011.
Voyad 3D Product List for Home Use; Apr. 2011.
Voyad Cinematic 3D Glasses Product List; Apr. 2011.
www.future3dcinema.com; Jun. 16, 2011.
www.hishock.com; Jun. 16, 2011.
www.li-tek.com; Jun. 16, 2011.
www.madeinchina.com; Jun. 16, 2011.

(56) References Cited

OTHER PUBLICATIONS www.sk13glasses.com; Jun. 16, 2011.
www.voyad.en.alibaba.com; Jun. 16, 2011.
XpanD 3D Cinema System—The Definitive Guide; 3D Cinema Glasses AGX101 User Instructions; XpanD 3D Cinema IR Emitter System; General Health and Safety Warning, Updated Dec. 2010.
XpanD 3D Universal 3D Glasses; Quick-Install User Guide; Sep. 30, 2010.
Turkish Search Report issued in Application No. 2011/02852 filed Mar. 25, 2011 (2 pages).
Turkish Search Report issued in Application No. 2011/00989 filed Feb. 2, 2011 (3 pages).
Expert Report of Lee Zaro, served in *X6D Limited* v. *Li-Tek Corp.*, No. 2:10-cv-02327-GHK-PJW (C.D. CA, Western Division), dated Aug. 8, 2011.
Case No. CV10 2327 GHK PJWx—Original Complaint for Damages and Injunctive Relief, and Demand for Jury Trial, Mar. 30, 2010.
Case No. CV10 2327 GHK PJWx—First Amended Complaint for Damages and Injunctive Relief, and Demand for Jury Trial, Jul. 8, 2010.
Case No. CV10 2327 GHK PJWx'Answer to First Amended Complaint and Counterclaims, Nov. 24, 2010.
Case No. CV10 2327 GHK PJWx—Defendants Li-Tek Corporation and Dongguan Li Wang Electronics and Plastics Co. Ltd's Answer, Affirmative Defenses and Counterclaims to Plaintiff's First Amended Petition, Dec. 23, 2010.
Case No. CV10 2327 GHK PJWx—Answer, Affirmative Defenses and Counterclaims of Defendants and Counterclaimants Li-Tek Corporation Company and Dongguan Li Wang Electronics and Plastics Co. Ltd to First Amended Complaint, Jan. 3, 2011.
Case No. CV10 2327 GHK PJWx—First Amended Answer and Counterclaims to First Amended Complaint, Jan. 7, 2011.
Case No. CV 10 2327 GHK PJWx—Second Amended Answer and Counterclaims to First Amended Complaint, Jan. 13, 2011.
Case No. CV10 2327 GHK PJWx—Plaintiff's Answer to GDC Defendant's Second Amended Answer and Counterclaims to First Amended Complaint, Jan. 20, 2011.
Petition to Make Special Under 37 CFR 1.102(d) on the Basis of Actual Infringement, Filed Mar. 26, 2010.
Bos, Philip et al., Field-Sequential Stereoscopic Viewing Systems Using Passive Glasses, Tektronnix, Inc., Beaverton, OR, 5 pages.

* cited by examiner

AMENDED

AMENDED

AMENDED

AMENDED

AMENDED

AMENDED